Patented Apr. 8, 1930

1,753,507

UNITED STATES PATENT OFFICE

OTTO FUCHS, OF CONSTANCE, GERMANY, ASSIGNOR TO HOLZVERKOHLUNGS-INDUSTRIE AKTIENGESELLSCHAFT, OF CONSTANCE, BADEN, GERMANY, A CORPORATION OF GERMANY

METHOD OF PRODUCING ACTIVATED CARBON

No Drawing. Application filed February 9, 1929, Serial No. 338,894, and in Germany January 13, 1928.

My invention relates to the manufacture of activated carbon and has for its object to provide a method of producing a uniformly high grade of such material.

Much difficulty has heretofore been experienced in obtaining good yields of activated carbon of high average activity. It has already been suggested that activation be carried on for shorter periods of time at higher temperatures, but the results obtained by such procedure have never been satisfactory, so that it has generally been believed that exposure of the carbon-containing material to activating conditions for a comparatively long period of time coupled with a comparatively low temperature was at least as effective as, if not indeed more effective than, a shorter activating period at a higher temperature, for example 900° to 1000° C. This view I have found, was based largely upon the experience gained in the manufacture of activated carbon as conducted up to the present time wherein raw material of non-uniform character was employed. Such non-uniform material, my researches have revealed, behaves non-uniformly under the conditions necessary to activate the same; in other words, particles of smaller size and lower density generally become activated first, while the larger particles of higher density or specific gravity are still only partially activated. If very high temperatures are employed to obtain thorough activation of the larger and heavier particles the smaller and more easily activated pieces become thoroughly activated at an early stage in the process and are to a large extent destroyed during the latter stages, as they react very easily with the activating gases at high temperature, thus considerably reducing the yield of activated carbon. Prior investigators have noted this reduction in yield at high temperatures and have therefore suggested that activated carbon should in most cases be manufactured by continuous processes at comparatively low temperature and for correspondingly longer periods of time, so that there have been employed for example vertical retorts which are charged from above and through which the carbon travels in about four to six hours; that is, it has generally been believed that the most suitable processes for activating carbon were those involving treatment for comparatively long periods of time at relatively low temperatures.

I have found, however, that in accordance with my invention much better yields may be obtained when the activation of the carbon-containing material is made to take place for comparatively short periods of time and at relatively high temperatures if the material is given the preliminary treatment described below. In carrying out my process the temperature and also the period of activation must be suited to the particular kind of raw material employed; for example beech wood charcoal may be treated for an hour or longer at 900° C. in order to obtain a good average activity, while the much more porous and looser linden or alder wood charcoal may be treated for a considerably shorter period at approximately such temperature. The materials are thus treated at higher temperatures than were formerly employed and for periods which are from one-third to at most one-half those hitherto considered necessary. It is advisable not to go much above 1000° C. so as to avoid graphitization.

In order that activation at high temperatures and for correspondingly short periods of time may produce good results the raw material employed must, in accordance with my invention, be uniform in character both as to the form and the weight of the particles and preferably also as to the size and specific weight thereof. Successful activation according to my process depends in large measure upon the care that is taken to insure complete uniformity of the particles to be treated.

In carrying out my process in its preferred form the raw carbon-containing material (e. g. the charcoal) is first brought to a condition wherein the particles thereof are uniform both as to form and weight and also as to size and specific weight. To accomplish such result the material is first mechanically treated to separate the decidedly splintery material from the more nearly spherical particles and the latter then treated, as by running the same over revolving cylindrical wire brushes having suitable grooves and rotating at speeds which are regulated relatively to each other, to roughen the smooth surfaces thereof. The approximately spherical particles so obtained are then sorted as to size. This sorting is followed by sorting according to specific weight, which can be readily accomplished for each size of particles by any known precipitating devices, such as those which operate with a vibrating motion and also, when necessary, by a blast of air.

If desired the material may be assorted in the form of the large pieces in which it is produced, according to the specific weight and other qualities. The loose porous carbon can be clearly distinguished by inspection from the high-carbon hard coal which is less suitable for activation. The material which has been so sorted by inspection is then subjected to the above described mechanical treatment for the purpose of removing the smooth surfaced splinters and converting the mass into particles of approximately spherical form and uniform size. With very uniform material the further separation according to specific weight may be omitted.

Under certain circumstances, as for example when the activation is to be conducted while the carbon is maintained in active whirling movement or in suspension by the current of activating gas, it is advisable to sort the carbon by means of a blast of air. This step may take place at any stage of the above described mechanical treatment. If such sorting by air is employed the subsequent separation into particles of equal size and equal specific weight may frequently be dispensed with, as the air sorting splits up a raw material of uniform (for example, spherical) shape into particles which behave uniformly during activation. Any group which may contain larger porous particles and also smaller particles of greater specific weight than such larger particles likewise behaves quite uniformly during the activating treatment if segregated by such method.

The above described sorting by means of a blast of air is of particular advantage in connection with those processes in which a large excess of activating gases is employed; for example, when such gases are circulated continuously so that it is possible to maintain the carbon particles always in a state of suspension during activation. The sorting by air is in such case preferably conducted in an apparatus similar to that employed during the activation, gas velocities and densities corresponding to those of the activating gases being preferably employed. In this way it is an easy matter to separate out those particles which would either pass through the activating space too quickly or, because of too great a density and too great a weight, tend to settle therein and thus be finally completely burned or consumed.

I have found by actual tests that material treated in accordance with the above described process gives increased yields of highly active carbon of remarkable uniformity, such yields in the case of beech wood charcoal amounting to 25% to 30% of the raw material, and up to 40%, when it is possible suitably to control the other conditions, especially temperature, and to employ activating gas in sufficient quantities and sufficiently preheated. This signifies, therefore, an increase in the yield of about 50% over that hitherto obtained and consequently a considerable reduction in the cost of raw materials, which to a large extent influences the price of active charcoal. In addition, the capacity of an existing plant is by my process increased to twice and even three times its rated capacity, whereby all other expenses are considerably reduced.

In order to introduce the necessary quantities of heat into the activating retorts in the necessarily short space of time it is advantageous, particularly when the activation takes place as an endothermic reaction, to employ retorts whose walls are composed of heat conducting material. It is usually difficult to charge the activating gases into the retorts at temperatures above 500° to 600° C. and the heat necessary for raising the temperature of these gases and likewise the total quantity of heat required for the activating reaction must therefore be applied by external heating; the retorts must therefore be heat conducting and should, of course, also be heat resistant, and composed of such material as will not give off any harmful substances to the charcoal. The retorts may, for example, be made of carborundum, special porcelain or similar resistant non-metallic material, or of special alloys, such as highly heat resistant chrome-nickel-iron alloys.

If desired the carbon particles may be treated with chemicals prior to subjecting them to my process.

Other variations may be resorted to within the scope of the appended claims without departing from the spirit of the invention.

I claim:

1. The method of producing activated carbon which comprises reducing carbonized material to particles of approximately uniform shape, size, and specific weight, and treating the same with activating gases for a comparatively short period of time at a temperature of approximately 900° C.

2. In a process for activating charcoal at elevated temperatures with the aid of gases, the step which comprises reducing carbonizing material to particles of approximately uniform shape, size and specific weight.

OTTO FUCHS.